US012039828B2

(12) United States Patent
Soukup et al.

(10) Patent No.: US 12,039,828 B2
(45) **Date of Patent: *Jul. 16, 2024**

(54) SYSTEM AND METHOD FOR PROVIDING PLAYER SERVICES USING A PROJECTION SURFACE GAMING SYSTEM

(71) Applicant: Konami Gaming, Inc., Las Vegas, NV (US)

(72) Inventors: Thomas E. Soukup, Las Vegas, NV (US); Sina Miri, Menlo Park, CA (US)

(73) Assignee: Konami Gaming, Inc., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/089,461

(22) Filed: Dec. 27, 2022

(65) Prior Publication Data

US 2023/0401922 A1 Dec. 14, 2023

Related U.S. Application Data

(63) Continuation of application No. 17/070,291, filed on Oct. 14, 2020, now Pat. No. 11,600,132.

(60) Provisional application No. 62/914,902, filed on Oct. 14, 2019.

(51) Int. Cl.
*G07F 17/32* (2006.01)

(52) U.S. Cl.
CPC ........ *G07F 17/3211* (2013.01); *G07F 17/322* (2013.01); *G07F 17/3239* (2013.01)

(58) Field of Classification Search
CPC . G07F 17/3211; G07F 17/322; G07F 17/3239
See application file for complete search history.

(56) References Cited

U.S. PATENT DOCUMENTS

| | | | | |
|---|---|---|---|---|
| 2004/0142742 | A1* | 7/2004 | Schneider | G07F 17/3237 463/25 |
| 2006/0177109 | A1* | 8/2006 | Storch | A63F 1/00 382/118 |
| 2008/0090651 | A1 | 4/2008 | Baerlocher | |
| 2009/0088239 | A1* | 4/2009 | Iddings | G07F 17/3244 463/43 |
| 2009/0124376 | A1 | 5/2009 | Kelly et al. | |
| 2010/0130280 | A1 | 5/2010 | Arezina et al. | |
| 2011/0115158 | A1* | 5/2011 | Gagner | G07F 17/322 463/31 |
| 2015/0087377 | A1 | 3/2015 | Yee et al. | |

* cited by examiner

*Primary Examiner* — Werner G Garner
(74) *Attorney, Agent, or Firm* — Howard & Howard Attorneys PLLC

(57) ABSTRACT

A projection surface gaming system for projecting video images onto a physical gaming table is described herein. The projection surface gaming system includes a video projection device, an object sensing system, and a controller including a processor. The processor is programmed to execute an algorithm including the steps of projecting a first image on a surface of the physical gaming table using the video projection device, detecting a player's interaction with an area of the physical gaming table displaying the first image using the object sensing system, and projecting a second image on the surface of the gaming table in response to detecting the player's interaction with the area of the first image.

20 Claims, 15 Drawing Sheets

68

| | Player Account ID | Patron Name | Birthdate | Tier Level Indicator | Total Wagers | Bonus Award Eligible? | FaceID |
|---|---|---|---|---|---|---|---|
| 70 | 10001313 | John Smith | 12/16/1965 | Platinum | $20,034 | Yes | FaceID092 |
| | 10001365 | Jane Doe | 01/12/1974 | Gold | $15,678 | Yes | FaceID102 |
| | 10002365 | Mary Doe | 07/29/1975 | Gold | $10,129 | No | FaceID120 |
| 74 | ANON001 | TBD | TBD | TBD | OPEN | Yes | FaceID952 |

FIG. 12

72

| Player Account ID | Gaming Session ID | Gaming Device ID | Table Seat Position | Date | Start | End | Total Wagers |
|---|---|---|---|---|---|---|---|
| 00001 | Session010 | TBL003 | Position 1 | 10/14/2020 | 12:32 | OPEN | $235 |
| ANON0012 | Session035 | TBL005 | Position 3 | 10/14/2020 | 14:23 | OPEN | $536 |
| 00201 | Session001 | EGM0235 | N/A | 10/12/2020 | 10:02 | 12:05 | $1,025 |

FIG. 13

90

| Player Seat Position (66) | Bonus Award Image (92) | Pixel Area Location (56) |
|---|---|---|
| Position 1 | Award101. gif | Selection top left: 1193, 609; Bounding rectangle size: 214 x 173; Area: 37,022 pixels square |
| | Award25. gif | Selection top left: 1316, 406; Bounding rectangle size: 203 x 148; Area: 30,044 pixels square |
| | Award035. gif | Selection top left: 1589, 290; Bounding rectangle size: 240 x 187; Area: 44,880 pixels square |
| Position 2 | Award065.gif | Section top left: 590, 637; Bounding rectangle size: 226 x 192; Area: 43,392 pixels square |
| | Award452.gif | Section top left: 868, 665; Bounding rectangle size: 190 x 179; Area: 34,010 pixels square |
| | Award035.gif | Section top left: 1170, 668; Bounding rectangle size: 267 x 146; Area: 38,982 pixels square |
| Position 3 | Award025.gif | Section top left: 242, 214; Bounding rectangle size: 216 x 218; Area: 47,088 pixels square |
| | Award065.gif | Section top left: 284, 464; Bounding rectangle size: 220 x 166; Area: 36,520 pixels square |
| | Award056.gif | Section top left: 535, 640; Bounding rectangle size: 224 x 174; Area: 38,976 pixels square |

FIG. 14

76

80 78

| Advance Incentive Trigger | | Bonus Award | | |
|---|---|---|---|---|
| Incentive Type | Value | Award Type | Award Amount | Selection Probability |
| Gaming Session Time | 1.5hr | Table Chips Credits | $100 | 10% |
| | | | $50 | 20% |
| | | | $10 | 70% |
| Gaming Session Average Wager Amount | $20 | Bonus Points | 1,000 | 5% |
| | | | 500 | 25% |
| | | | 250 | 70% |
| Gaming Session Total Amount Wagered | $250 | Free Play | $100 | 5% |
| | | | $25 | 30% |
| | | | $10 | 65% |

FIG. 15

76

78

| Award Amount | Selection Probability |
|---|---|
| $100 | 2% |
| $50 | 5% |
| $25 | 5% |
| $10 | 10% |
| $5 | 78% |

FIG. 16

SYSTEM AND METHOD FOR PROVIDING PLAYER SERVICES USING A PROJECTION SURFACE GAMING SYSTEM

CROSS-REFERENCE TO RELATED APPLICATION

This application is a continuation of U.S. patent application Ser. No. 17/070,291, filed Oct. 14, 2020, which claims the benefit of U.S. Provisional Patent Application No. 62/914,902, filed Oct. 14, 2019, the disclosures of which are hereby incorporated by reference in their entirety.

FIELD OF THE INVENTION

The present invention relates to systems and methods for providing player services using a projection surface gaming system in conjunction with a player tracking system.

BACKGROUND OF THE INVENTION

Table games are very popular among casino customers as a form of community gaming that incorporates interaction with live dealers. However, table games players become frustrated as they are not able to utilize and interact with all the features and functions the casino loyalty program. For example, table game players are not awarded Bonuses as frequently as Electronic Gaming Machine (EGM) or Electronic Table Game (ETG) loyalty program players. Checking their loyalty program points balance, number of drawing tickets awarded, and other player loyalty features and statuses and offers is more cumbersome than their EGM/ETG player counterparts who can access this information directly on the player tracking display of the gaming machine they are playing. Typically, a table game player must leave the table game and visit the player's club or a Kiosk to check their award and membership features statuses. Interactive player loyalty Bonusing is automated in the player tracking system for EGM's and ETG's. EGM and ETG players can be automatically awarded Bonuses via the player tracking system with awards and features such as, free slot play, electronic complementary vouchers, electronic drawing tickets, and so on. Notification of Bonus awards are displayed to the EGM/ETG player through the player tracking displays installed in each EGM or ETG or via picture-in-picture directly on the EGM/ETG screen. In some cases, the Bonus award is revealed as an interactive Bonus game which the player can interact with via the player tracking touchscreen display. Whereas, table games players are often limited to receiving manually issued complementary physical vouchers for meals and other amenities in the casino by the table games staff only at the end of their gaming session. In some instances, a table game player must print out their own complementary vouchers or match play vouchers at a Kiosk prior to, or after playing at a table game.

The player tracking system can automatically monitor player wagering activities on EGM's and ETG's using the gaming machines meters such as coin-in and coin-out for each player wager (handle pull). However, tracking player wagering activity on table games is typically a manual process performed by table game supervisors or the dealers. The table games supervisor or dealer must manually enter the player's buy-in, average wager, hands played, walk-with and other wager activity measures into the player tracking system. Moreover, changes to the player's buy-in, average wager, hands played, walk-with and other wager activities measures are updated less frequently than EGM's or ETG's in the player tracking system since the process is manual. Often only when player commences play and ends their play at a table game are the player's wagering activity measures updated and recorded in the player tracking system. Over the past few years, some manufactures have made stride to automatic portions of tracking a table games player wagering activity. Theses automations include but are not limited to table games chip recognition, card recognition, hand recognition, and other innovations to automate the tracking of player wagering activity at table games. These innovations have enabled player tracking system to more effectively and accurately Bonus a table games player more frequently. However, the challenge remains how to communicate the award of the Bonus to the player or allow them to interact with the Bonus since an interactive player tracking display is not installed at each table game seat.

The present invention addresses one or more of the aforementioned challenges.

SUMMARY OF THE INVENTION

In different embodiments of the present invention, systems and methods for operating a projection surface gaming system for projecting video images onto a physical gaming surface in a casino environment, are provided.

In one aspect of the present invention, a projection surface gaming system for projecting video images onto a physical gaming table is provided. The projection surface gaming system includes a video projection device, an object sensing system, and a controller including a processor. The processor is programmed to execute an algorithm including the steps of projecting a first image on a surface of the physical gaming table using the video projection device, detecting a player's interaction with an area of the physical gaming table displaying the first image using the object sensing system, and projecting a second image on the surface of the gaming table in response to detecting the player's interaction with the area of the first image.

In another aspect of the present invention, a method of operating a projection surface gaming system is provided. The projection surface gaming system includes a video projection device, an object sensing system, and a controller including a processor. The method includes the processor performing the algorithm steps of projecting a first image on a surface of the physical gaming table using the video projection device, detecting a player's interaction with an area of the physical gaming table displaying the first image using the object sensing system, and projecting a second image on the surface of the gaming table in response to detecting the player's interaction with the area of the first image.

In another aspect of the present invention, a non-transitory computer-readable storage media having computer-executable instructions embodied thereon is provided. When executed by at least one processor the computer-executable instructions cause the at least one processor to perform steps of an algorithm including projecting a first image on a surface of a physical gaming table using a video projection device, detecting a player's interaction with an area of the physical gaming table displaying the first image using an object sensing system, and projecting a second image on the surface of the gaming table in response to detecting the player's interaction with the area of the first image.

BRIEF DESCRIPTION OF THE DRAWINGS

Other advantages of the present invention will be readily appreciated as the same becomes better understood by reference to the following detailed description when considered in connection with the accompanying drawings wherein:

FIGS. 12-16 are illustrations of exemplary data files generated by the system shown in FIG. 1, according to embodiments of the present invention;

Corresponding reference characters indicate corresponding parts throughout the drawings.

DETAILED DESCRIPTION OF INVENTION

Figure 1:
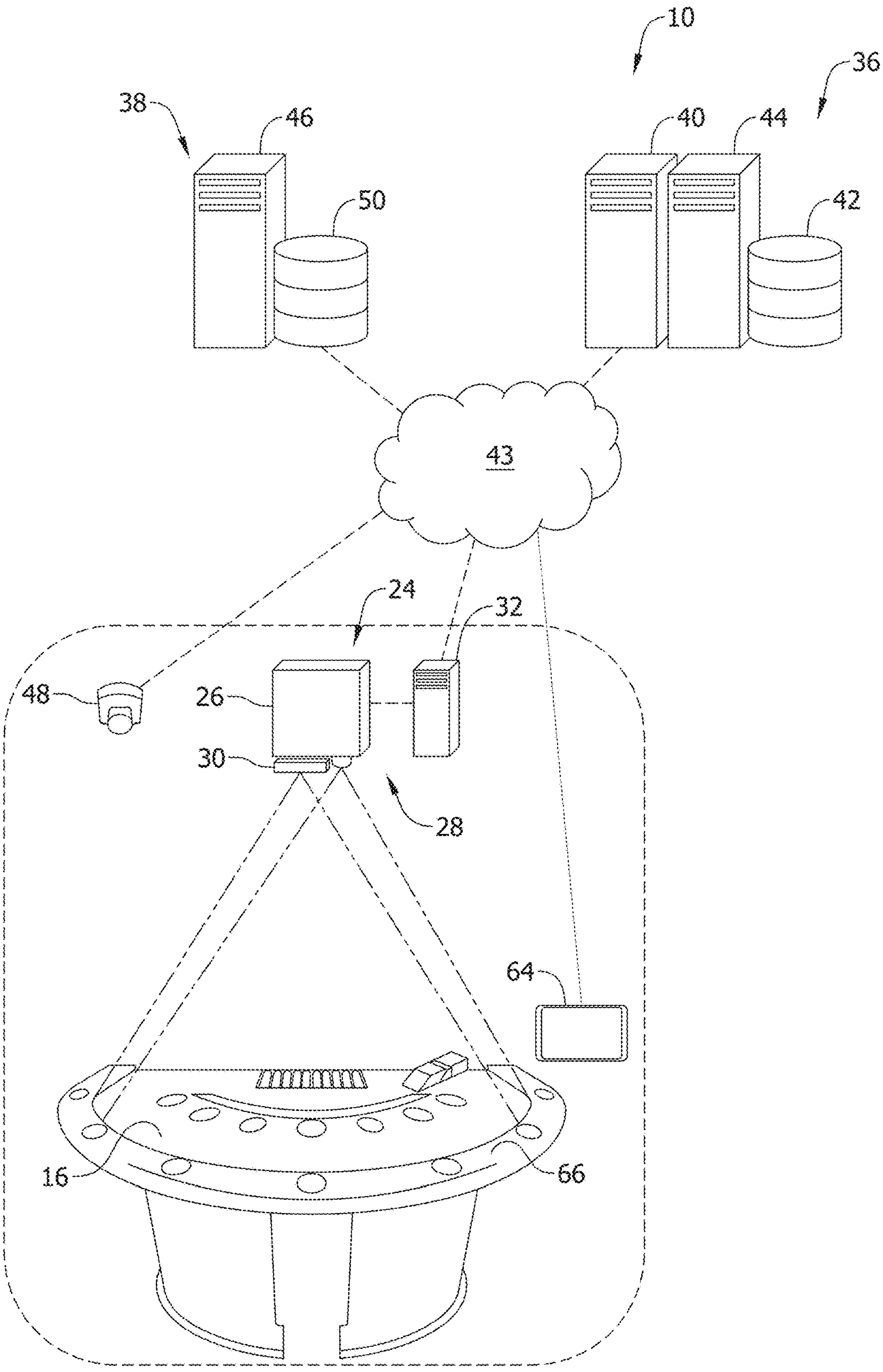
FIG. 1 is a schematic illustration of a projection surface gaming system, according to embodiments of the present invention.
Figure 2:
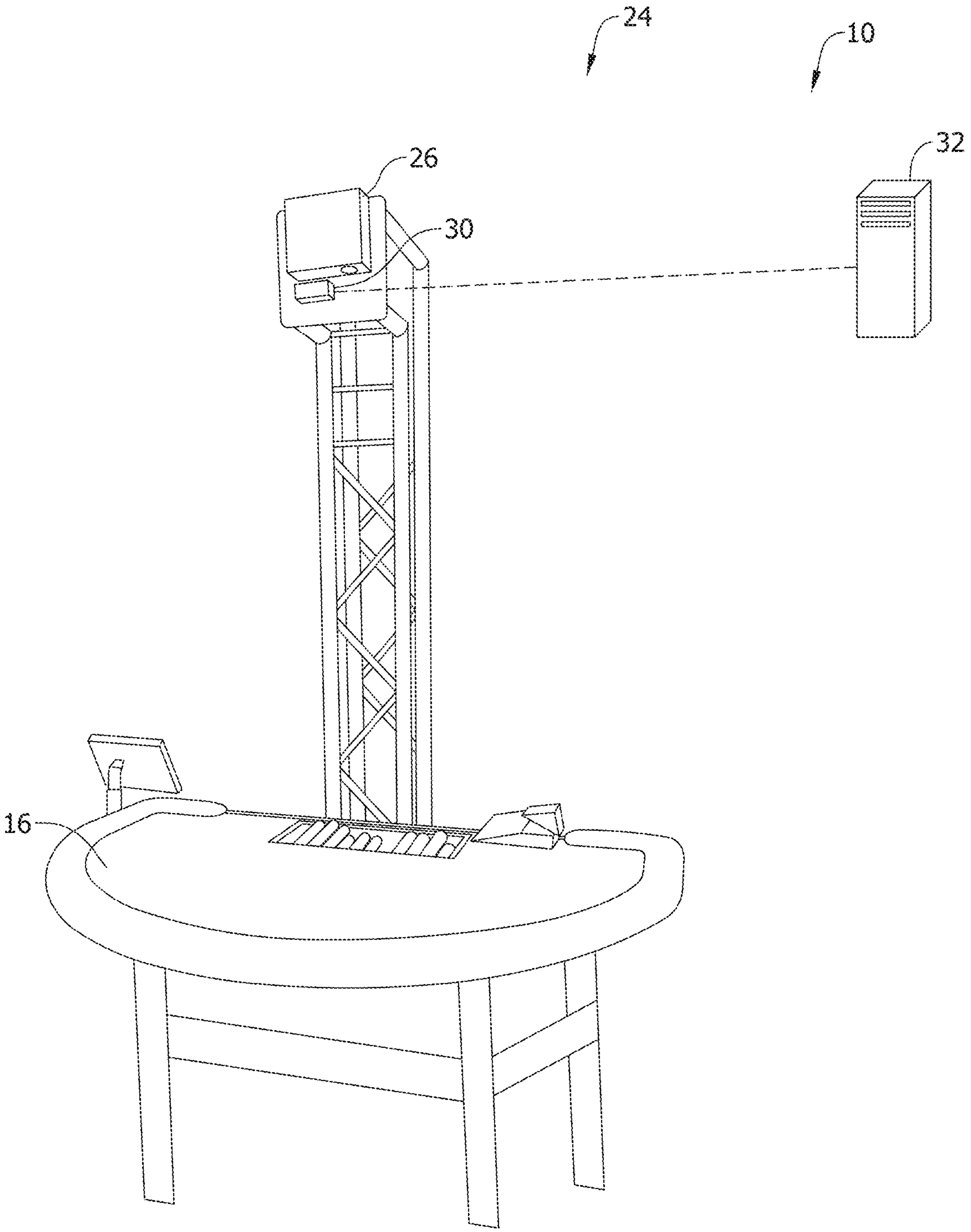
FIGS. 2-3 are schematic illustrations of a projection surface gaming device that may be used with the projection surface gaming system show in FIG. 1.
Figure 3:
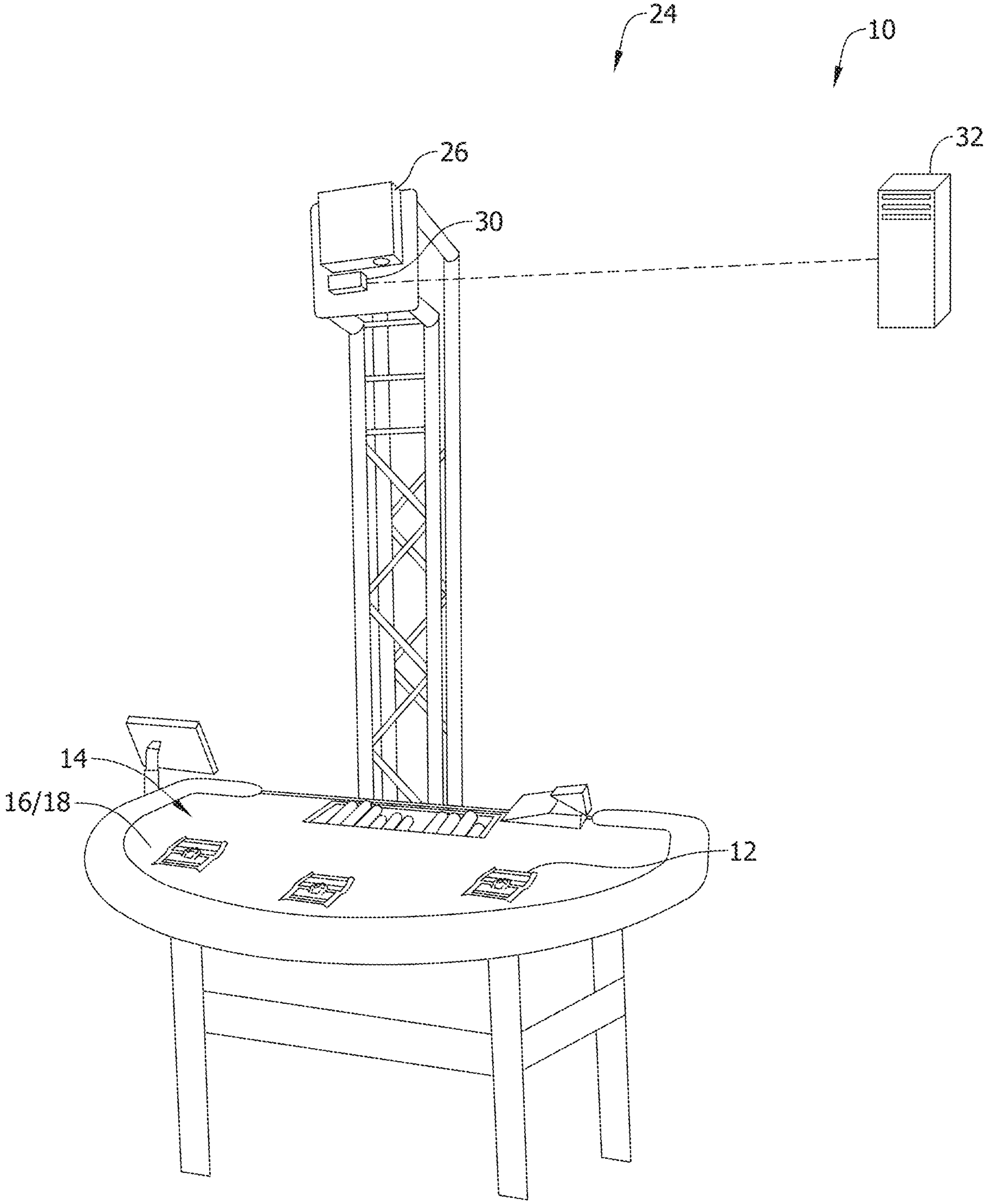

With reference to the drawings, and in operation, the present invention includes a projection surface gaming system or controller coupled to a player tracking system that includes automated systems and controls in the creation of visual presentations. More specifically, embodiments of the present invention include systems and methods of using projection mapping for game interaction and communication with players on table games and other gaming surfaces. The system can visualize augmented reality perspectives onto surfaces without requiring the users to wear special glasses or goggles. Projection mapping is a technique used to create the illusion of objects where they don't physically exist.

The systems may be used on gaming tables and other surfaces to enhance customer experience, deliver player tracking membership information such as, membership points balances, number of electronic drawing tickets issued, unredeemed complementary vouchers, table game match play (free play) and other common marketing and player tracking casino loyalty program features and functions.

The projection can consist of images and videos as well as include interaction mechanism for individuals to take actions such as logging into their player tracking account, interacting with the player tracking system to request a host, order a drink, redeeming awards associated with their player loyalty account, navigating through player tracking menus and sub-menus, making selections from the player tracking menu of choices or even placing a bet using funds from fund on deposit in their player tracking cashless wagering account among other player tracking features and functions.

Images and videos are projected onto surfaces using spatial coordinates using projectors, computer software and hardware. The projection can be fixed to specific coordinates or moved through them. The system may also include a computer application program that can project using predetermined patterns, use input from the player tracking system or use input from external sources. Players response to the images and actions may be collected by cameras. The projection can include messages, advertisement or player loyalty program information, and marketing/bonusing information onto the physical surface.

Referring to FIGS. 1-3 and 17-18, in the illustrated embodiment, the present invention includes a projection surface gaming system 10 that is programmed to project game images 12 of a projection bonus game 14 onto a gaming surface 16, detect movement along the gaming surface 16 caused by a player's interaction with the areas of the gaming surface 16, and execute play of the projection bonus game 14 based on the detected movements along the gaming surface 16 by modifying the projected game images 12 being displayed on the gaming surface 16. The gaming surface 16 may include, for example, a physical gaming table 18, a tabletop display 20, a projection screen 22, or any suitable surface upon which a visual projection may be displayed.

In the illustrated embodiment, the projection surface gaming system 10 includes a video imaging system 24 that includes a video projection device 26, an object sensing system 28 including a depth-sensing camera 30, and a game control server 32 coupled to the video projection device 26 and the depth-sensing camera 30.

The video projection device 26 is spaced a distance from the gaming surface 16 and is configured to project the game images 12 onto the gaming surface 16. For example, in one embodiment, the game control server 32 includes a controller including one or more processors that are programmed to generate a computer model of a three-dimensional object containing geometric oriented information and control the video projection device 26 to generate and project game images 12 of the computer model to a physical object (e.g., gaming surface 16) that corresponds precisely to the computer model. Additional details of a computer program for generating and projecting images of a computer model of a three-dimensional object to a physical object is described in U.S. Pat. No. 5,687,305 to Graham et al., issued Nov. 11, 1997, titled "Projection of Images of Computer Models in Three Dimensional Space", which is incorporated herein by reference in its entirety.

The depth-sensing camera 30 is configured to detect movement of objects along the gaming surface 16 and transmit information associated with the sensed movement to the game control server 32. Additional details of processing of images received by the camera, triggering conditions and responsively generating an event which may be used in the present invention, are described in U.S. patent application Ser. No. 14/484,068 to Jeffery D. George et al., filed Sep. 11, 2014, titled "System and Methods for Operating Gaming Environments", published Mar. 26, 2015 as U.S. Patent Application Publication No. 2015/0087417, which is incorporated herein by reference in its entirety.

The game control server 32 is programmed to execute game play based on the sensed movement and modify the game images 12 to display the projection bonus game 14. For example, as shown in FIGS. 10A-11E, the game control server 32 may operate the video projection device 26 to display a bonus game image 14 onto a gaming table surface 18. The bonus game image 14 includes a plurality of bonus award symbol images 12 being displayed on the gaming table. The depth-sensing camera 30 detects a movement of the player's hand onto one of the bonus award symbol images 12 and transmits information indicated the sensed movement to the game control server 32. Upon detecting the player's hand moving onto the bonus award symbol image

12, the game control server 32 executes a bonus projection bonus game 14 by modifying the game images 12 to display the bonus projection bonus game 14 including an award being displayed to the player.

As shown in FIGS. 17 and 19A-19D, the game control server 32 may also be programmed to operate the video projection device 26 to display a game including game images 12 projected onto a semi-transparent tabletop display surface 20 to display a game area 34 to the player. The depth-sensing camera 30 detects a location and type of movement of the player's hand onto the tabletop display surface 20 and transmits the detected movement to the game control server 32. The game control server 32 determines a location of the detected movement within the game area 34 and executes the projection bonus game 14 based on the location and type of detected player movement by modifying the game images 12 to display progress of the projection bonus game 14.

Referring to FIG. 1, in the illustrated embodiment, the projection surface gaming system 10 may also include a casino entertainment monitoring system 36 that is coupled to a facial recognition system 38 and to the video imaging system 24. The casino entertainment monitoring system 36 includes a casino management server 40 and a player tracking account database 42 such as, for example, SYNKROS™ available from Konami™. The casino management server 40 is coupled to the facial recognition system 38 and the video imaging system 24 via a communications network 43 such, as, for example, the Internet, a cellular telecommunications network, a wireless network and/or any suitable telecommunication network. The casino management server 40 may include a player tracking system 44 that is also coupled in communication with a plurality of gaming devices located within a casino property such as, for example, electronic gaming machines (EGMs) including slot machines, electronic table games (ETGs), video slot machines and video gaming machines, a kiosk, a gaming table, electronic gaming table, a table games dealer computing device (e.g., mobile computing device, handheld computing device, and/or table mounted computing device), and/or a mobile computing device such as, for example a smartphone and/or tablet computer.

The casino management server 40 is programmed to operate the video imaging system 24 to project the game images 12 onto the gaming surface 16 by executing the algorithms show in FIGS. 6-11E and described herein. The casino management server 40 may also be programmed to perform additional functions such as, real-time multi-site, slot accounting, player tracking, cage credit and vault, sports book data collection, Point of Sale (POS) accounting, keno accounting, bingo accounting, and table game accounting, a wide area progressive jackpot, and electronic funds transfer (EFT). The database 42 is configured to generate and store a plurality of data files (shown in FIGS. 12-16) that may be accessed by the casino management server 40 for use in executing the algorithms described herein. Additional details of the casino entertainment monitoring system 36 are described in U.S. patent application Ser. No. 11/094,605 to Tim Britt et al., filed Mar. 30, 2005, titled "Entertainment Monitoring System and Method", (Now U.S. Pat. No. 7,303,475) which is incorporated herein by reference in its entirety.

The facial recognition system 38 includes a facial recognition server 46 that is coupled in communication with a plurality of imaging devices 48 such as, for example, internet protocol cameras (IP cameras) positioned within the casino property. The facial recognition server 46 is coupled to a biometric database 50 that includes a plurality of biometric data records. Each biometric data record includes facial image data associated with a facial image of a casino user and a unique face ID. The facial recognition server system is programmed to receive video images from the imaging devices 48 and access a biometric database to retrieve a biometric data records having image data matching the received video image. The facial recognition server 46 is also programmed to generate and transmit a notification signal to the casino management server 40 that includes a corresponding face ID included in the retrieved biometric data record and an imaging device location ID. The casino management server 40 is programmed to access a player tracking account data file upon receiving the notification signal from the facial recognition server 46 and identify a known user account record having a user face ID matching the corresponding face ID included in the received notification signal. The casino management server 40 may also identify a gaming device associated with the imaging device location ID and transmit a session initiation signal to the identified gaming device. Additional details of the casino management server 40 and the facial recognition server 46 for identifying casino users which may be used in the present invention, are described in U.S. patent application Ser. No. 16/519,378 to Thomas Soukup et al., filed Jul. 23, 2019, titled "Casino Management System with a Patron Facial Recognition System and Methods of Operating Same", published Jan. 30, 2020 as U.S. Patent Application Publication No. 2020/0035064, which is incorporated herein by reference in its entirety.

Each server may include one or more server computers that each include a processing device that includes a processor that is coupled to a memory device. The processing device executes various programs, and thereby controls components of the server according to user instructions received from the gaming devices and/or other servers. The processing device may include memory, e.g., read only memory (ROM) and random-access memory (RAM), storing processor-executable instructions and one or more processors that execute the processor-executable instructions.

Figure 4:
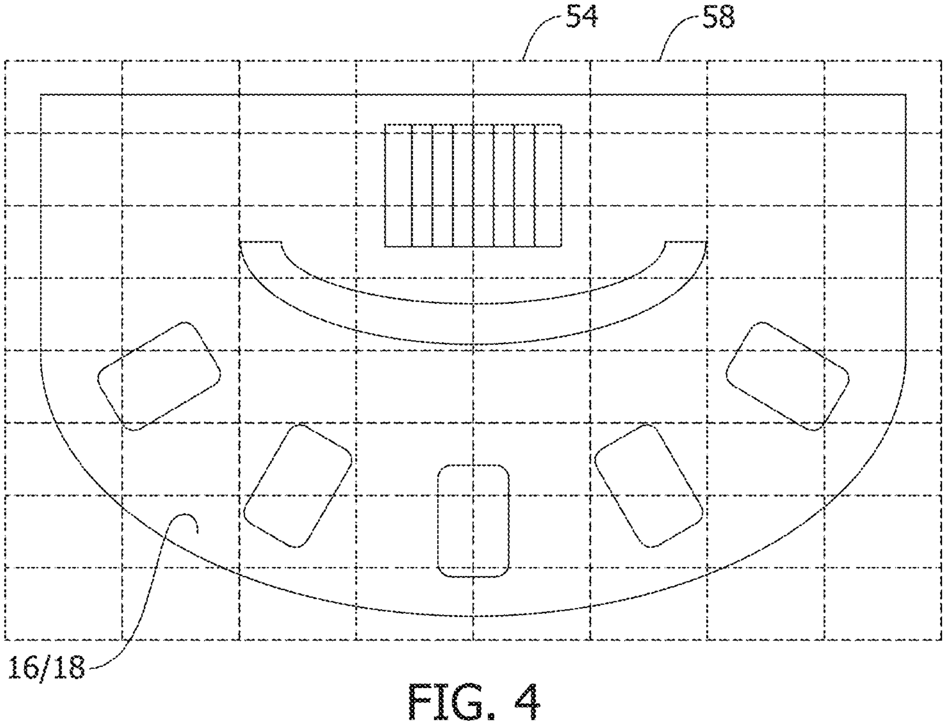
FIGS. 4-6 are illustrations of the operation of the projection surface gaming system shown in FIG. 1.
Figure 5:
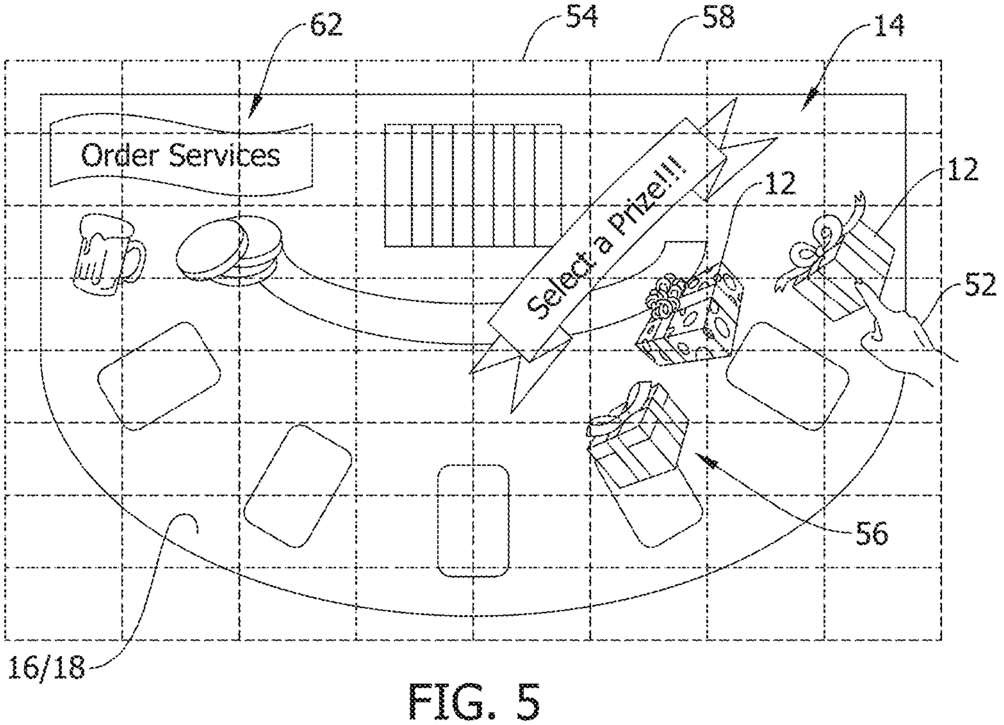

Referring to FIGS. 4-5, in one embodiment, the casino management server 40 is programmed to operate the video imaging system 24 to display an interactive projection bonus game 14 onto the surface of a gaming table 18. For example, the casino management server 40 may operate the video imaging system 24 to display a video animation on the physical gaming table 18 including a plurality of bonus award images 12. The casino management server 40 then operates the video imaging system 24 to detect a movement of an object 42 (e.g., a player's hand) across the bonus award images 12 indicating a selection of an award image 12 by the player and display an award image sequence associated with the player selected award image 12 on the physical gaming table 18.

In one embodiment, the game control server 32 is programmed to operate the video projection device 26 to display the bonus award images 12 within a predefined field-of-view 54 overlaying the surface 16 of the physical gaming table 18, with each game image 12 being displayed with a predefined location on the gaming table 18. The field-of-view 54 may include a predefined special coordinate system that is used to define the location of the images 12 being displayed on the gaming surface 16. The game control server 32 is also programmed to operate the depth-sensing camera 30 to capture images within the predefined field-of-view 54 and detect objects such as, for example, the players hand 52 appearing within the field-of-view 54.

For example, the game control server 32 may display each game image 12 at a predefined pixel area location 56 with a pixel grid 58 defined within the predefined field-of-view 54 of the video projection device 26. The pixel grid 58 may be used to define the special coordinate system used to define the location of the images 12 being displayed on the gaming surface 16. The game control server 32 operates the depth-sensing camera 30 to detect the appearance of the player's hand 52 within the field-of-view 54 and determines the pixel area location 56 of the player's hand 52. The game control server 32 then determines the bonus award image 12 being displayed within the determined pixel area location 56 of the player's hand 52 indicating a player's selection of the determined bonus award image 12 and displays an award image sequence associated with the player selected bonus award image 12.

In other embodiments, the casino management server 40 may be programmed to receive a live video feed of the gaming table 18 and monitor predefined locations defined along the gaming table 18. For example, the casino management server 40 may receive live video images of the gaming table 18 from the video imaging system 24, display the live video images within a display area of a webpage, and define event areas within the display area overlaying a portion of the gaming table image. Each event area may be defined to include an area displaying a corresponding bonus award image 12. The casino management server 40 then determines the players selection by detecting a change in an image characteristic within an event area indicating the player's hand being positioned over the corresponding bonus award image 12. Additional details of the casino management server 40 for use in recognizing objects within video images which may be used in the present invention, are described in U.S. patent application Ser. No. 14/670,119 to Jeffery D. George et al., filed Mar. 26, 2015, titled "System and Methods for Operating Gaming Environments", published Jul. 16, 2015 as U.S. Patent Application Publication No. 2015/0199872, which is incorporated herein by reference in its entirety.

With reference to FIGS. 6-11E, in the illustrated embodiment, the casino management server 40 may be programmed to execute the algorithms 200, 300, 400, and 500 for providing promotional awards and casino services to casino property patrons. The methods include a plurality of steps that may be performed independently of, or in combination with, other method steps. Portions of the methods may be performed by any one of, or any combination of, the components of the projection surface gaming system 10. For example, the game control server 32 may be programmed to function as the casino management server 40 to perform some or all of the algorithm steps described herein.

In the illustrated embodiment, the casino management server 40 includes one or more processors that are programmed to execute the algorithms shown in FIGS. 6-11E, and described herein. For example, the casino management server 40 is programmed to detect an appearance of a player positioned at a physical gaming table 18 and determine a player tracking account associated with the player. The casino management server 40 the determines whether the player is eligible for a bonus award and initiates the bonus game 14 (shown in FIGS. 10A-11E) upon determining the player is eligible for a bonus award. The casino management server 40 initiates the bonus game 14 by operating the video projection device 26 to display a video animation on the physical gaming table including a plurality of bonus award images 12. Each bonus award image 12 is associated with a predefined location on the physical gaming table 18. The casino management server 40 then detects an object 42 (e.g., the player's hand) moving onto the physical gaming table 18 using the object sensing system 28 and determines a location of the detected object 42. The casino management server 40 identifies a bonus award image 12 displayed at the determined location of the detected object 42, determines an award associated with the identified bonus award image 12, and displays an award image sequence 60 (shown in FIGS. 10D, 11D, and 11E) associated with the determined award on the physical gaming table 18. The casino management server 40 may also update the player tracking account associated with the player to include the determined award associated with the identified bonus award image.

In other embodiments, the casino management server 40 may be programmed to operate the video projection device 26 to display a plurality of casino service images 62 on the physical gaming table 18. Each casino service image 62 indicates a casino service provided by the casino and is associated with a predefined location on the physical gaming table 18. For example, the casino management server 40 may display an image of a cocktail glass associated with a drink service provided by the casino. The casino management server 40 may be programmed to detect an object moving across a corresponding casino service image 62 being displayed on the physical gaming table 18 and responsively initiate a corresponding casino service associated with the corresponding casino service image 62. For example, upon detecting a player or dealer's hand moving across the image of the cocktail glass 62, the casino management server 40 may then notify a casino host to initiate a drink service at the gaming table 18.

In method step 202, the casino management server 40 opens a player rating to start a gaming session and track play. For example, in some embodiment, the casino management server 40 may receive a player tracking request from a dealer via a table games dealer computing device 64 associated with the gaming table. The player tracking request may include player information such as, for example, a player name, player ID, card ID, or any suitable information for use in identifying a player tracking account. In some embodiments, the player information may also include a player seat position 66 located at the gaming table 18. Upon receiving the player information, the casino management server 40 may access a player tracking account data file 68 (shown in FIG. 12) and select a player tracking account record 70 associated with the received player information. In other embodiments, the casino management server 40 may receive player information including a face ID and an imaging device location ID from the facial recognition system 38. The casino management server 40 accesses the player tracking account data file 68 to determine the player tracking account record 70 associated with the player by identifying a matching player tracking account record having a corresponding face ID matching the received face ID. The casino management server 40 may also identify the physical gaming table 18 associated with the imaging device location ID. The casino management server 40 may also be programmed to transmit a verification message to the table games dealer computing device 64 requesting the dealer to verify the player and identified player tracking account record 70. In some embodiments, the verification message may also include a request to identify the player seat position 66 occupied by the verified player. In other embodiments, the player seat position 66 may be determined by the casino management server 40 upon detecting the appearance of the player at the physical gaming table 18 using the depth-sensing camera 30.

Upon determining the player tracking account record 70 associated with the player, the casino management server 40 then initiates a gaming session to track the play of the player. For example, the casino management server 40 may generate a gaming session file 72 (shown in FIG. 13) associated with the identified player tracking account record 70 and monitor the gaming session to update the gaming session file 72. In some embodiments, the casino management server 40 may receive wagering information associated with the player from the dealer via the table games dealer computing device 64 and update the gaming session file 72 to include the received wagering information. In addition, the casino management server 40 may also include the player seat position 66 occupied by the player in the gaming session file 72. The casino management server 40 may also monitor the gaming session by tracking events and identifying objects on the gaming table 18 using the object sensing system 28. The casino management server 40 may also close the gaming session once the player has completed play and left the gaming table and update the identified player tracking account record 70 to include information included gaming session file 72 once the gaming session has closed. For example, the casino management server 40 may receive a signal from the dealer via the table games dealer computing device 64 requesting the gaming session to be closed and/or detect the player leaving the gaming table 18 via the object sensing system 28 and/or the facial recognition system 38.

In other embodiments, the casino management server 40 may determine that the player does not have a corresponding player tracking account record 70. For example, the casino management server 40 may receive a notification from the dealer via the table games dealer computing device 64 indicating that an unknown player is seated at the gaming table 18, or the casino management server 40 may determine that the player tracking account data file 68 does not include a player tracking account record having player information matching the player information received from the table games dealer computing device 64 and/or the facial recognition server 46. Upon determining that the player is an un-carded anonymous player (i.e., a player that does not have an associated player tracking account record), the casino management server 40 generates an anonymous player tracking account record 74 and initiates a gaming session to track play including a gaming session file 72 associated with the anonymous player tracking account record 74.

In method step 204, the casino management server 40 determines whether the player is eligible for a bonus award. For example, the casino management server 40 may include a bonusing engine that determines if the player is eligible for a bonus. The bonus engine can use multiple methods such as, the player (known or "tracked anonymous") initiates plays or simply shows up, or based on a wager threshold, etc. In some embodiments, the casino management server 40 monitors wagering activity of the player and initiates the bonus game upon determining the monitored wagering activity is qualified wagering activity. For example, the bonus engine of the casino management server 40 may be programmed to access bonus award files 76 (shown in FIGS. 15 and 16) to determine whether wagering activity by a player would trigger a bonus award. The bonus award file 76 may include, for example, a plurality of bonus awards 78 associated with a plurality of triggering conditions 80 associated with wagering activity such as gaming session time, average wagering amount, total wagering amount, and the like. The casino management server 40 may also determine whether the identified player tracking account record 70 includes an indication that the player is eligible for a bonus award. In some embodiments, the casino management server 40 may determine that the player is eligible for a bonus award upon determining the player to be an anonymous player. In other embodiments, the casino management server 40 may randomly select one or more players for a bonus award. If the casino management server 40 determines that the player is not eligible, the casino management server 40 returns to method step 202 and continues to track play.

In method step 206, upon determining that the player is eligible for a bonus award, the casino management server 40 operates the video imaging system 24 to display the projection bonus game 14 on the gaming table 18 to provide a bonus award to the player.

In method step 208, as a result of the projection bonus game 14, the bonus award is awarded to the player and tracked in the player tracking account record. For example, upon completing the projection bonus game 14, the casino management server 40 updates the player tracking account record 70 to include the bonus award. The casino management server 40 then returns to tracking play until the bonus engine determines the player has met criteria that makes them eligible for another projection bonus game 14.

In some embodiments, the casino management server 40 and/or the controller of the game control server 32 may include one or more processors that are programmed to execute an algorithm that includes the steps of projecting a first image on a surface 16 of the physical gaming table 18 using the video projection device 26 and detecting a player's interaction with an area of the physical gaming table 18 displaying the first image using the object sensing system 28. For example, the first image may include the project game images 12 of a projection bonus game 14, a player tracking information menu including player data (shown in FIG. 6), casino service images 62, and/or any suitable images that ma be projected on physical surfaces. The processor may then execute the algorithm including the steps of projecting a second image on the surface 16 of the gaming table 18 in response to detecting the player's interaction with the area of the first image. For example, if the processor is displaying the projection bonus game 14, the processor may display the award image sequence 60 upon detecting the player's interaction with one of the game images 12. In addition, if the processor is displaying the player tracking information menu and/or casino service images 62, the processor may display images including a player tracking submenu or additional messages associated with the player's selection. The processor may also be programmed to receive player data from a player tracking system 44 and project the first image on the surface of the physical gaming table including player data received from the player tracking system. The processor may also be programmed to notifying the player tracking system 44 of the player's interaction with the area of the first image. The processor may also be programmed to detect a physical player loyalty card being placed on the surface 16 of the gaming table 18 by the player using the object sensing system 28 and send an image of the physical player loyalty card to the player tracking system 44.

Figure 8:
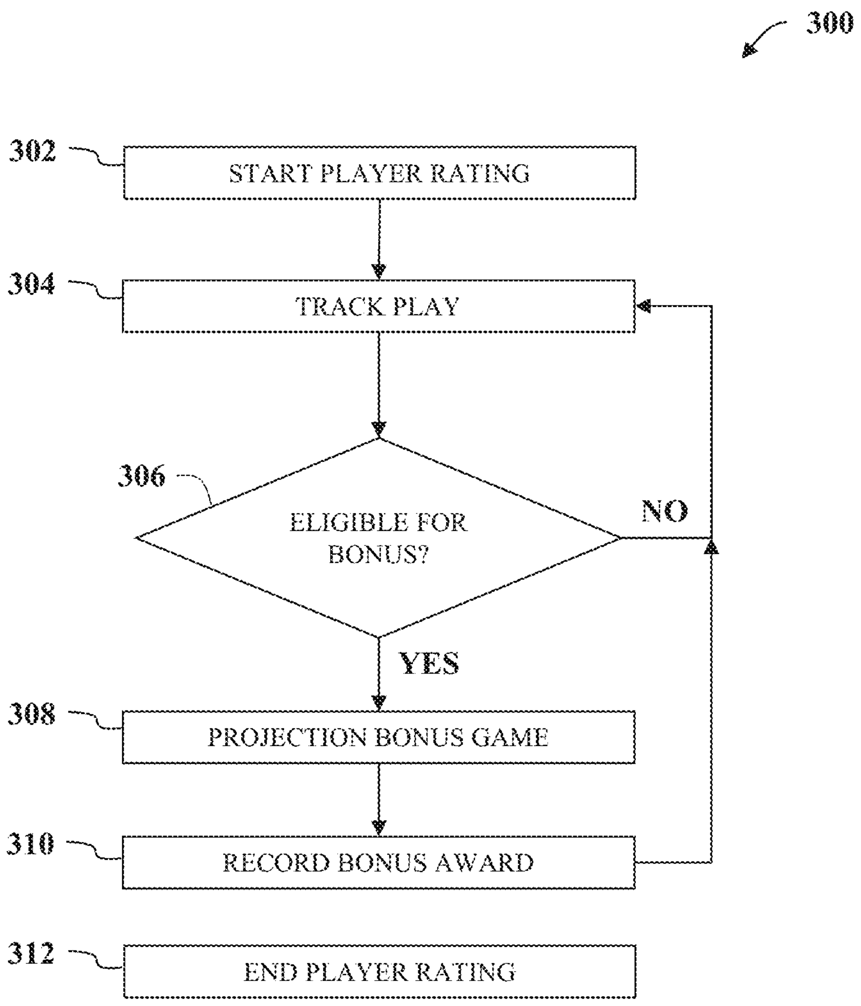
Figure 9:
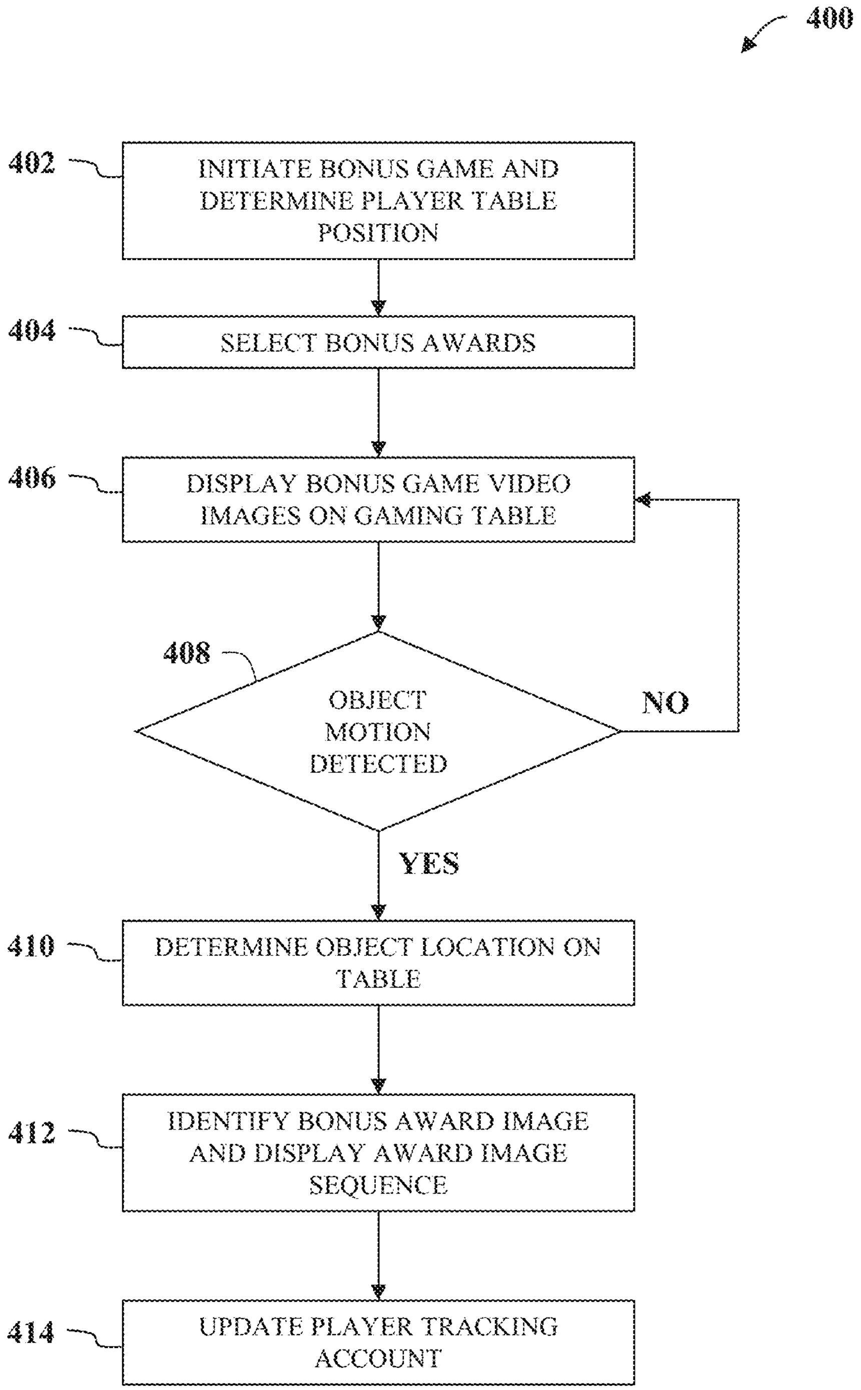
Figure 10A:
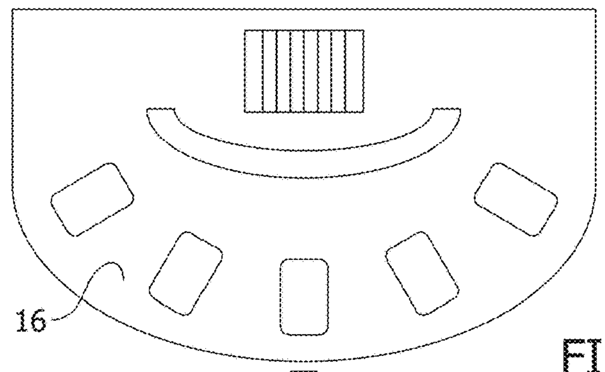
FIGS. 10A-11E are illustrations of the operation of the projection surface gaming device shown in FIGS. 2-3.
Figure 10B:
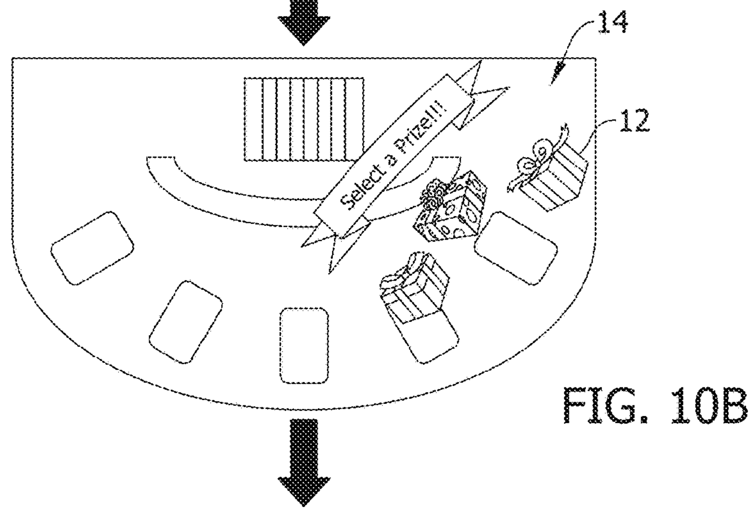
Figure 10C:
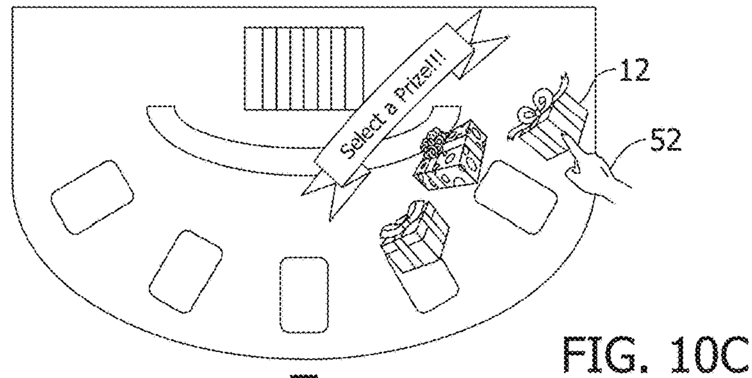
Figure 10D:
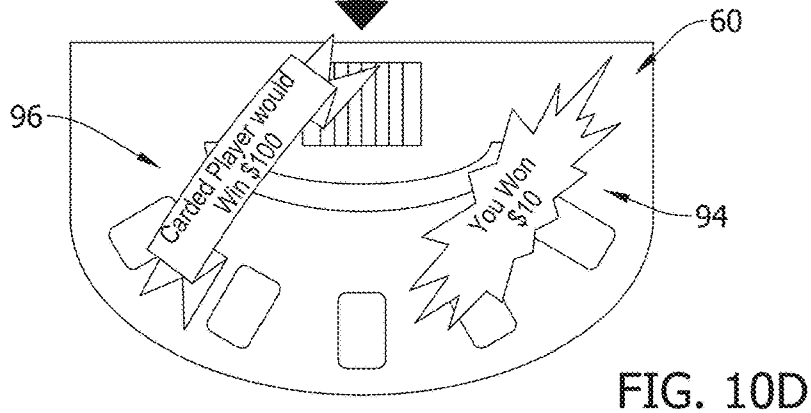
Figure 11A:
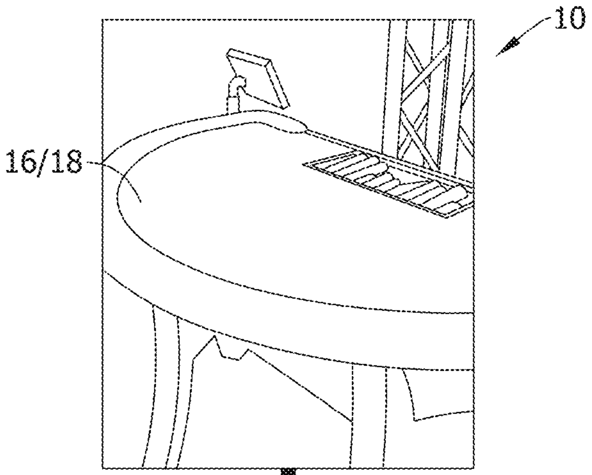
Figure 11B:
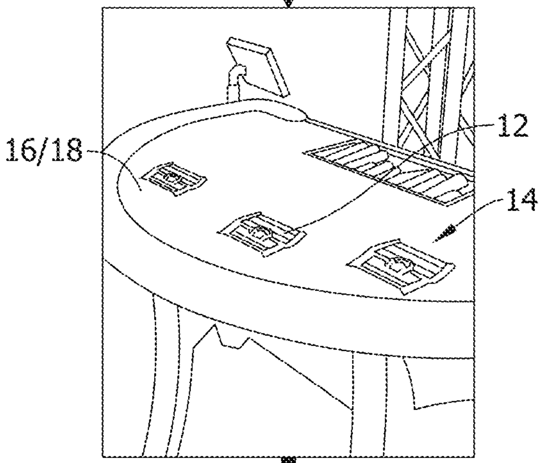
Figure 11C:
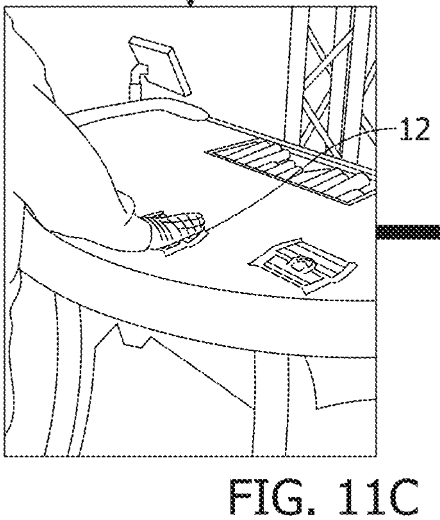
Figure 11D:
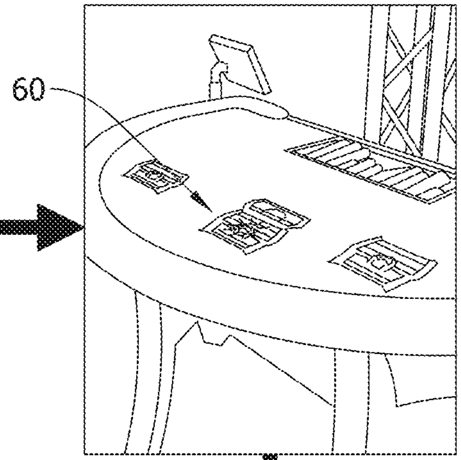
Figure 11E:
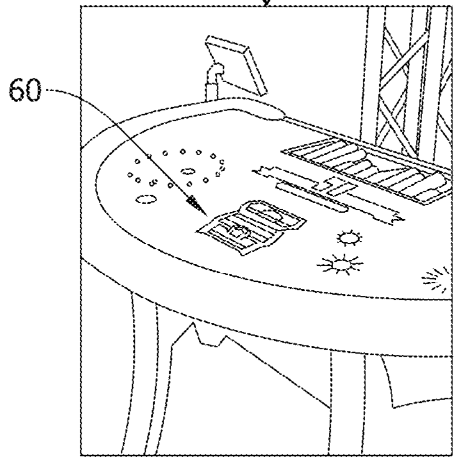
Figure 17:
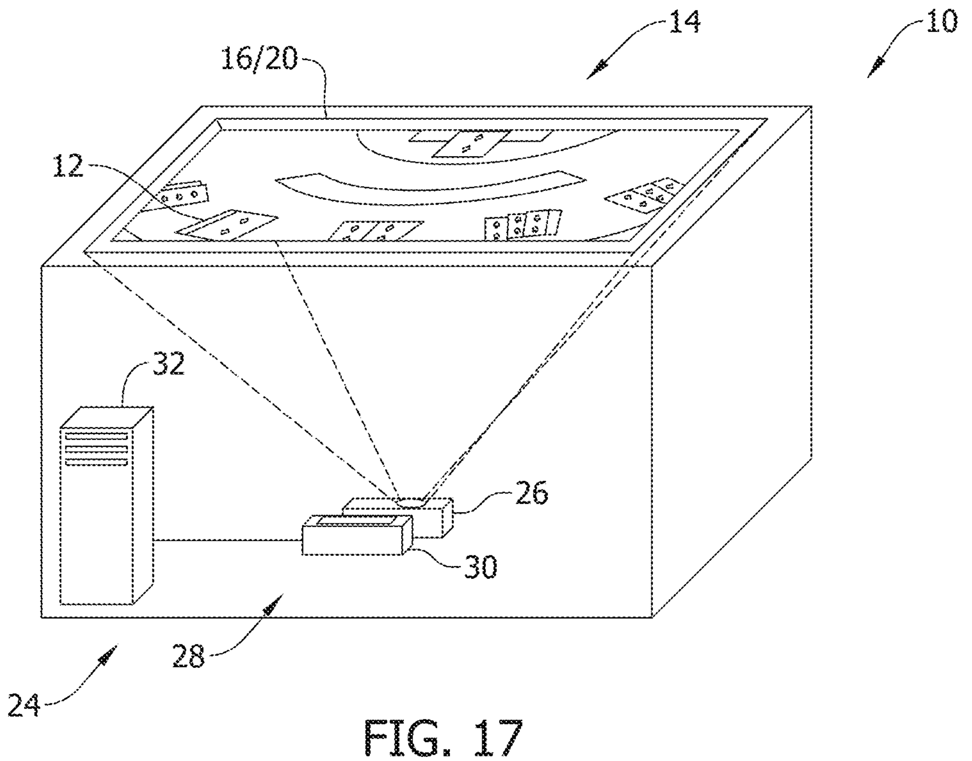
FIGS. 17-18 are schematic illustrations of the projection surface gaming device shown in FIGS. 2-3, according to another embodiment of the present invention.
Figure 18:
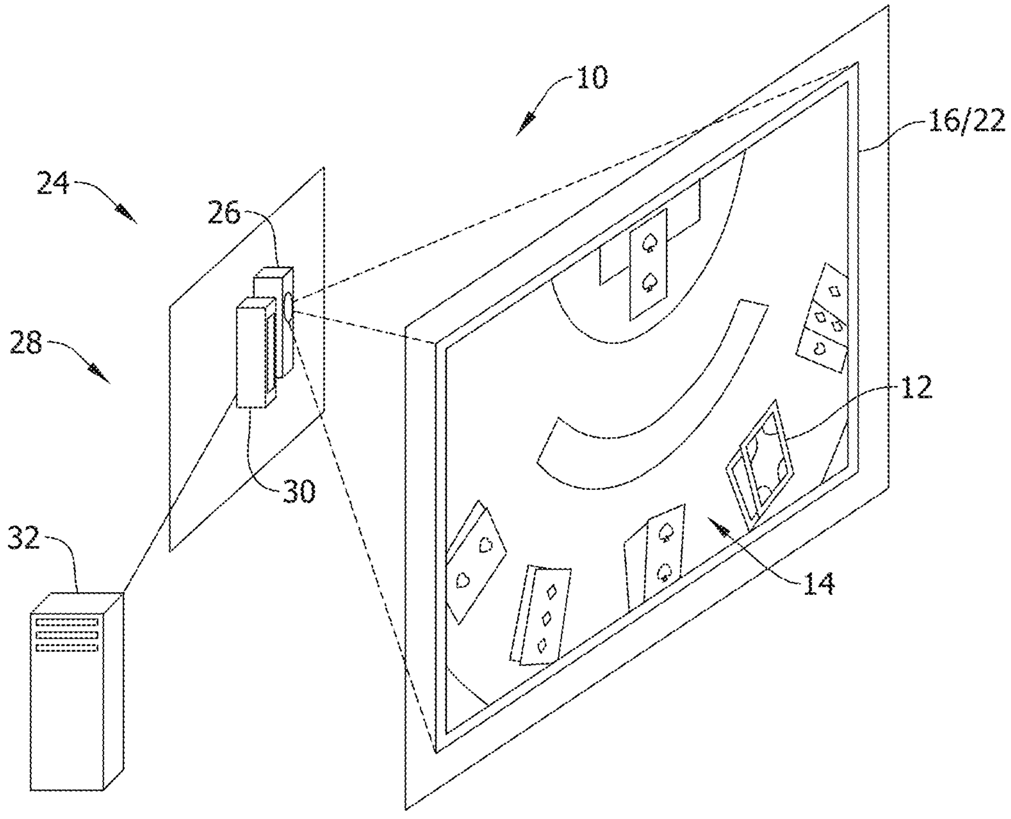
Figure 19A:
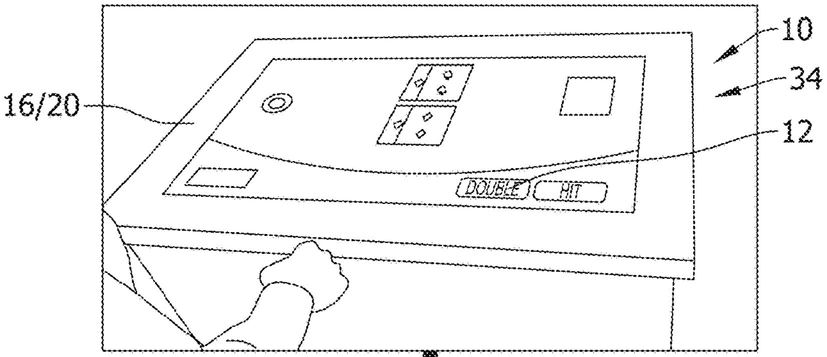
FIGS. 19A-19D are illustrations of the operation of the projection surface gaming device shown in FIGS. 2-3 and 17-18.
Figure 19B:
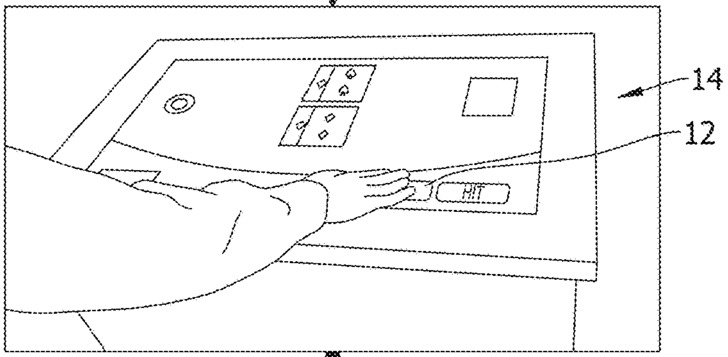
Figure 19C:
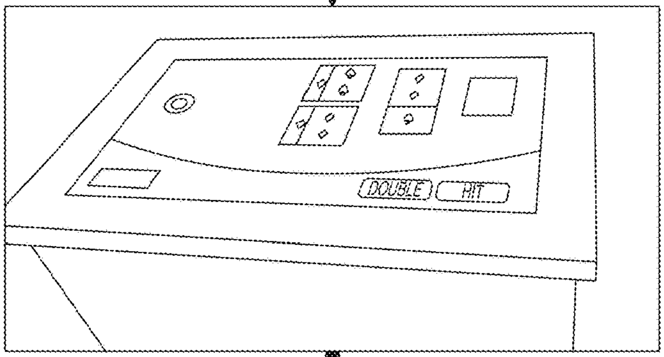
Figure 19D:
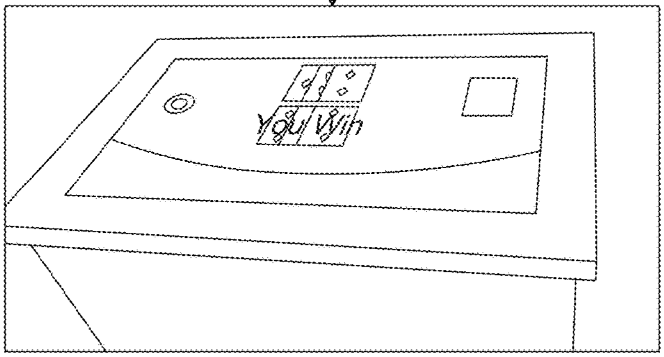

Referring to FIG. 8, in some embodiments, the casino management server 40 includes one or more processors that are programmed to execute the algorithms shown in method 300. In method step 302, the player tracking system 44 identities the player seated at the table game seat 66 and open a player tracking session rating associated to that player. In some cases, the player will be a known player in the player tracking system and in other instance, the player may be a refused name/anonymous player. In method step 304, the wagering activity of both a known player (i.e., member of the player loyalty program) or refused name anonymous player is tracked in the player tracking system. Additional details of tracking of a refused name or anonymous player is described in U.S. Pat. No. 10,769,887 to Soukup et al., issued Sep. 8, 2020, titled “Casino Management System with Anonymous Player Bonusing”, which is incorporated herein by reference in its entirety. In method step 306, the wagering activity of the player is evaluated by the player tracking system to determine if the player is eligible for a Bonus award. In method step 308, if the Bonus criteria configured in the player tracking system is met, then a projection bonus game 14 as illustrated in FIGS. 10A-11E and described herein is played, and the resulting award is recorded in the player tracking system in method step 310. The bonus award could be one or more of the following: Bonus points, Bonus comp points, several drawing tickets, an electronic complementary voucher for a casino amenity, a free drink, match play among other types of awards supported by the player tracking system. The method 300 illustrated in FIG. 8 may be a closed loop model in which each time information changes pertaining to the tracked play in the rating session (e.g., buy-in, win/loss, total number of hands played, etc., . . . , ) in method step 304, the player session is again evaluated at method step 306 to determine if the player meets the Bonusing criteria to be eligible to play the project bonus game at method step 308. At method step 312, tracking the play of the player and determining bonus awards ends when the player leaves the gaming table and the player tracking session rating associated to the player ends. In another embodiment, the projection bonus game 14 may not require player interaction but simply be a notification to the player of their award.

Figure 6:
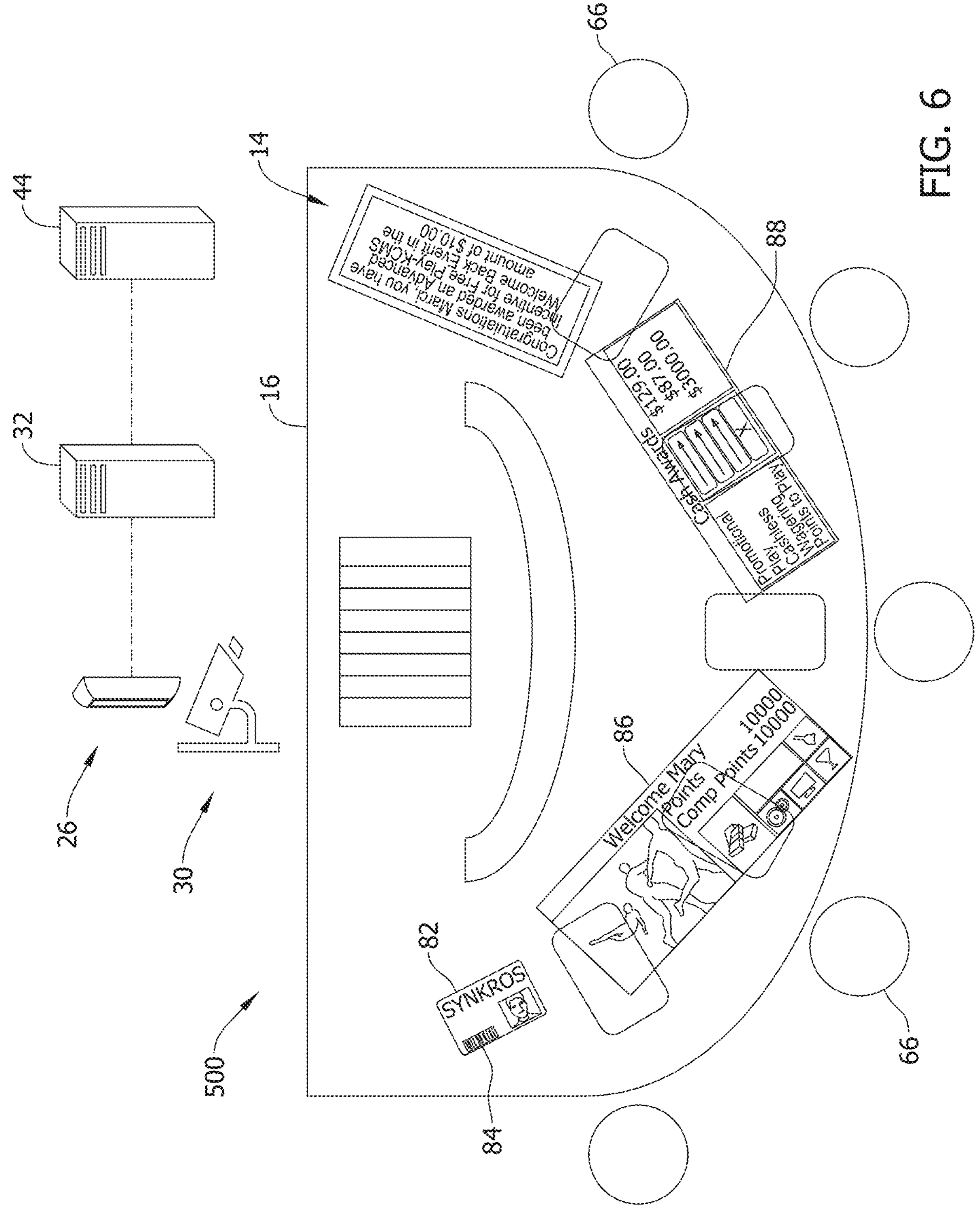
Figure 7:
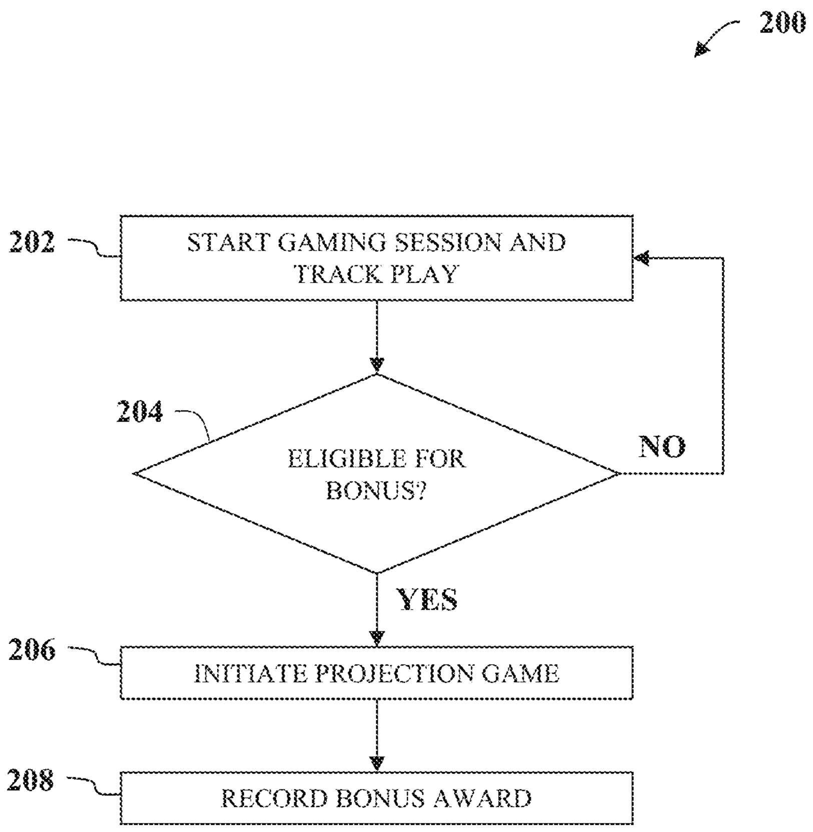
FIGS. 7-9 are flowcharts of algorithms that may be implemented by the system shown in FIG. 1 for projecting video images onto a physical gaming surface, according to embodiments of the present invention.

Referring to FIG. 6 in the illustrated embodiment, the system 10 is programmed to execute methods 500 to facilitate the player identifying themselves. For example, in one embodiment, the player may place their player loyalty card 82 on the gaming surface 16 and the depth-sensing camera 30 may process the bar code image 84 displayed on the player loyalty card 82 which uniquely identifies the player. The game control server 32 process the bar code image can then transmit the bar code information to the player tracking system 44 causing the player to be identified and the table rating session to start in methods 200 and/or 300. In another embodiment, the player may place their mobile phone which is displaying a bar code of their player loyalty card 82 on the gaming surface 16 and the depth-sensing camera 30 may read the bar code which uniquely identifies the player.

The system 10 may also implement a method to display player tracking information menu 86 to the player. The player tracking information menu 86 may include but is not limited to the player point and comp point balances, as well as activating features through the processing of those images and adding events to the player tracking system such as page attendant, drink request and other features and functions of the player tracking system.

The system 10 may also implement methods for the player to interact with the player tracking system 44. In one embodiment, if the player selects the cash menu button from the player tracking information menu 86, a cash submenu 88 may be displayed. The depth-sensing camera 30 may detect the movement of the player’s hand to select the cash menu button and communicate with the game control server 32 to communicate with the player tracking system 44 a triggering event. As a result of detecting the player’s hand action to view the cash submenu 88, the video projection device 26 can display the cash submenu 88 from the player tracking system. In response to detecting the player’s hand movements and by communicating with the player tracking system with the method described above, the player can navigate the player tracking menu and sub-menus. Additionally, activate player tracking functions such as, redeem previously award match play at the table game, convert their accrued player points for match play (free play) at the table game, access their cashless funds to place wagers or buy additional chips, and so on.

In some embodiments, the casino management server 40 may execute algorithm 400 to provide the projection bonus game 14 to the player. For example, in method step 402, upon determining that the player is eligible for a bonus award, the casino management server 40 initiates the projection bonus game 14 by determining the player seat position 66 associated with the eligible player. For example, in one embodiment, the casino management server 40 may access the gaming session file 72 to determine the occupied by the player seat position 66 occupied by the eligible player and/or transmit a request to the dealer via the table games dealer computing device 64 to identify the player seat position 66 occupied by the eligible player.

In method step 404, the casino management server 40 selects one or more bonus awards to be included in the projection bonus game 14. For example, in one embodiment, the casino management server 40 identifies the bonus awards 78 included in the identified player tracking account 70. In other embodiments, the casino management server 40 may access the bonus award file 76 to select bonus awards associated with the triggering activity. The bonus award file 76 may also include selection probabilities associated with each of the bonus awards 78. The casino management server 40 may be programmed to randomly select one or more of the bonus awards 78 to be award to the player using the selection probabilities. In other embodiments, the casino management server 40 may identify a plurality of eligible bonus awards associated with the determined player tracking account 70 and randomly associate an eligible bonus award with each of the plurality of bonus award images 12 being displayed with the projection bonus game 14.

In method step 406, the casino management server 40 operates the video projection device 26 to display a video animation on the physical gaming table 18 including a plurality of bonus award images 12. Each bonus award image 12 is associated with a predefined location on the physical gaming table 18. For example, in some embodiments, the casino management server 40 may access a projection game display file 90 (shown in FIG. 14) that includes information for use in displaying the projection bonus game 14 including, but not limited to, bonus award image data 92, pixel area location data 56 associated with each bonus award image 12, and a player seat position 66 associated with the bonus award images 12. Upon determining the player seat position 66 associated with the eligible player, the casino management server 40 may access the projection game display file 90 to determine the bonus award images 12 and corresponding pixel area locations associated with the determined player seat position 66. The casino management server 40 then associates the bonus award images 12 with the selected bonus awards and operates the video projection device 26 to display video animation of the bonus award images 12 at the predefined locations across the gaming table 18.

In method step 408, the casino management server 40 determines whether motion across the gaming table has been detected indicating a player’s selection of the bonus award images 12. For example, the casino management server 40 detects an object 42 moving onto the physical gaming table using the object sensing system 28.

Upon detecting the object 42 moving onto the physical gaming table 18, in method step 410 the casino management server 40 determines a location of the detected object 42 using the object sensing system 28.

In method step 412, the casino management server 40 identifies the bonus award image 12 being displayed at the determined location of the detected object 42, determines an award associated with the identified bonus award image 12, and displays an award image sequence 60 associated with the determined award on the physical gaming table 18. For example, the casino management server 40 may operate the game control server 32 to display each bonus award image 12 at the pixel area location 56 within the pixel grid 58 identified in the projection game display file 90. The casino management server 40 then operates the depth-sensing camera 30 to detect the appearance of the player's hand 52 within the field-of-view 54, determines the pixel area location 56 of the player's hand 52, and determines the bonus award image 12 being displayed within the determined pixel area location 56 of the player's hand 52 indicating a player's selection of the determined bonus award image 12. The casino management server 40 then operates the video projection device 26 to display an award image sequence 60 associated with the determined award on the physical gaming table 18.

In method step 414, the casino management server 40 then updates the player tracking account to include the determined award associated with the identified bonus award image 12. In some embodiments, upon detecting a player's selection of a bonus award image 12, the casino management server 40 may display a verification request on the table games dealer computing device 64 prompting the dealer to verify that the eligible player selected the bonus award image 12. The casino management server 40 then updates the player tracking account to include the determined award upon receiving a verification signal from the dealer via the table games dealer computing device 64. By allowing the dealer to verify the selection by the eligible player, the casino management server 40 prevents an award being provided when a player other than the eligible player attempts to select an image.

In some embodiments, the casino management server 40 may be programmed to initiate the projection bonus game 14 upon identifying the player as an un-carded anonymous player. The casino management server 40 then generates an anonymous player tracking account record 74 associated with the un-carded anonymous player and updates the anonymous player tracking account record 74 to include the determined award associated with the identified bonus award image. The casino management server 40 may also display the award image sequence 60 including an un-carded player award image 94 indicating the determined award associated with the identified bonus award image and a carded player award image 96 indicating an award available to a carded player.

Obviously, many modifications and variations of the present invention are possible in light of the above teachings. The invention may be practiced otherwise than as specifically described within the scope of the appended claims.

A controller, computing device, or computer, such as described herein, includes at least one or more processors or processing units and a system memory. The controller typically also includes at least some form of computer readable media. By way of example and not limitation, computer readable media may include computer storage media and communication media. Computer storage media may include volatile and nonvolatile, removable and non-removable media implemented in any method or technology that enables storage of information, such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media.

The order of execution or performance of the operations in the embodiments of the invention illustrated and described herein is not essential, unless otherwise specified. That is, the operations described herein may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

In some embodiments, a processor, as described herein, includes any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term processor.

In some embodiments, a network, as describe herein, includes a network addressable system that, in various example embodiments, comprises one or more physical servers and data stores. The one or more physical servers are operably connected to a computer network via, by way of example, a set of routers and/or networking switches. In an example embodiment, the functionality hosted by the one or more physical servers may include web or HTTP servers, FTP servers, as well as, without limitation, webpages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), Flash, ActionScript, and the like. Data stores may store content and data relating to, and enabling, operation of the networking system as digital data objects. A data object, in particular implementations, is an item of digital information typically stored or embodied in a data file, database or record. Content objects may take many forms, including text (e.g., ASCII, SGML, HTML), images (e.g., jpeg, tif and gif), graphics (vector-based or bitmap), audio, video (e.g., mpeg), or other multimedia, and combinations thereof. Content object data may also include executable code objects (e.g., games executable within a browser window or frame), podcasts, etc. Data stores corresponds to one or more of a variety of separate and integrated databases, such as relational databases and object-oriented databases, that maintain information as an integrated collection of logically related records or files stored on one or more physical systems.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Other aspects and features of the present invention can be obtained from a study of the drawings, the disclosure, and the appended claims. The invention may be practiced otherwise than as specifically described within the scope of the appended claims. It should also be noted that the steps and/or functions listed within the appended claims, notwithstanding the order of which steps and/or functions are listed therein, are not limited to any specific order of operation.

Although specific features of various embodiments of the invention may be shown in some drawings and not in others, this is for convenience only. In accordance with the principles of the invention, any feature of a drawing may be referenced and/or claimed in combination with any feature of any other drawing.

What is claimed is:

1. A projection surface gaming system for projecting video images onto a physical gaming table, comprising:

a facial recognition system;

an object sensing system;

a video projection device; and a controller coupled to the facial recognition system and the video projection device, the controller including a processor programmed to execute an algorithm including the steps of:

receiving a face ID associated with a player from the facial recognition system; and initiating a bonus game upon identifying the player as a refused name player by:

operating the video projection device to display an animated award image sequence on a gaming surface of the physical gaming table including a plurality of bonus award images associated with predefined locations on the physical gaming table, each bonus award image being displayed at a predefined pixel area location within a pixel grid defined within a predefined field-of-view of the video projection device;

detecting a location of a player interaction associated with the plurality of bonus award images using the object sensing system and determining a corresponding pixel area location associated with the detected location of the player interaction;

identifying a corresponding bonus award image being displayed at the corresponding pixel area location; and operating the video projection device to replace the corresponding bonus award image with a refused name player award image indicating a first award available to an anonymous player and a carded player award image indicating a second award available to a carded player.

2. The projection surface gaming system of claim 1, wherein the processor is programmed to execute the algorithm including the steps of:

generating an anonymous player tracking account associated with the refused name player; and crediting the first award available to an anonymous player to the anonymous player tracking account.

3. The projection surface gaming system of claim 2, wherein the processor is programmed to execute the algorithm including the steps of:

detecting a physical player loyalty card being placed on the gaming surface of the gaming table using the object sensing system;

identifying a player tracking account associated with the detected physical player loyalty card; and initiating a gaming session associated with the identified player tracking account.

4. The projection surface gaming system of claim 1, wherein the processor is programmed to execute the algorithm including the steps of:

identifying a player tracking account associated with the player upon identifying a matching player tracking account having a corresponding face ID matching the received face ID; and initiating a gaming session associated with the identified player tracking account to track play of the player.

5. The projection surface gaming system of claim 4, wherein the processor is programmed to execute the algorithm including the steps of:

operating the video projection device to display a player tracking information menu on the physical gaming table upon identifying the player tracking account associated with the player.

6. The projection surface gaming system of claim 5, wherein the processor is programmed to execute the algorithm including the steps of:

identifying a player seat position occupied by the player; and operating the video projection device to display the player tracking information menu on the physical gaming table at a location associated with the identified player seat position.

7. The projection surface gaming system of claim 4, wherein the processor is programmed to execute the algorithm including the steps of:

monitoring wagering activity of the player and initiating a second bonus game upon determining the monitored wagering activity is qualified wagering activity.

8. A method of operating a projection surface gaming system including a facial recognition system, an object sensing system, a video projection device, and a controller including a processor operably coupled to the facial recognition system and the video projection device, the method including the processor performing an algorithm including the steps of:

receiving a face ID associated with a player from the facial recognition system; and initiating a bonus game upon identifying the player as a refused name player by:

operating the video projection device to display an animated award image sequence on a gaming surface of the physical gaming table including a plurality of bonus award images associated with predefined locations on the physical gaming table, each bonus award image being displayed at a predefined pixel area location within a pixel grid defined within a predefined field-of-view of the video projection device;

detecting a location of a player interaction associated with the plurality of bonus award images using the object sensing system and determining a corresponding pixel area location associated with the detected location of the player interaction;

identifying a corresponding bonus award image being displayed at the corresponding pixel area location; and operating the video projection device to replace the corresponding bonus award image with a refused name player award image indicating a first award available to an anonymous player and a carded player award image indicating a second award available to a carded player.

9. The method of claim 8, wherein the method includes the processor performing the algorithm including the steps of:

generating an anonymous player tracking account associated with the refused name player; and crediting the first award available to an anonymous player to the anonymous player tracking account.

10. The method of claim 9, including the processor performing the algorithm including the steps of:

detecting a physical player loyalty card being placed on the gaming surface of the gaming table using the object sensing system;

identifying a player tracking account associated with the detected physical player loyalty card; and initiating a gaming session associated with the identified player tracking account.

11. The method of claim 8, including the processor performing the algorithm including the steps of:

identifying a player tracking account associated with the player upon identifying a matching player tracking account having a corresponding face ID matching the received face ID; and initiating a gaming session associated with the identified player tracking account to track play of the player.

12. The method of claim 11, including the processor performing the algorithm including the steps of:

operating the video projection device to display a player tracking information menu on the physical gaming table upon identifying the player tracking account associated with the player.

13. The method of claim 12, including the processor performing the algorithm including the steps of:

identifying a player seat position occupied by the player; and operating the video projection device to display the player tracking information menu on the physical gaming table at a location associated with the identified player seat position.

14. The method of claim 11, including the processor performing the algorithm including the steps of:

monitoring wagering activity of the player and initiating a second bonus game upon determining the monitored wagering activity is qualified wagering activity.

15. A non-transitory computer-readable storage medium having computer-executable instructions embodied thereon to operate a projection surface gaming system including a facial recognition system, an object sensing system, a video projection device, and a controller including a processor operably coupled to the facial recognition system and the video projection device, when executed by the processor the computer-executable instructions cause the processor to perform an algorithm including the steps of:

receiving a face ID associated with a player from the facial recognition system; and initiating a bonus game upon identifying the player as a refused name player by:

operating the video projection device to display an animated award image sequence on a gaming surface of the physical gaming table including a plurality of bonus award images associated with predefined locations on the physical gaming table, each bonus award image being displayed at a predefined pixel area location within a pixel grid defined within a predefined field-of-view of the video projection device;

detecting a location of a player interaction associated with the plurality of bonus award images using the object sensing system and determining a corresponding pixel area location associated with the detected location of the player interaction;

identifying a corresponding bonus award image being displayed at the corresponding pixel area location; and operating the video projection device to replace the corresponding bonus award image with a refused name player award image indicating a first award available to an anonymous player and a carded player award image indicating a second award available to a carded player.

16. The non-transitory computer-readable storage media of claim 15, wherein the computer-executable instructions cause the processor to perform the algorithm including the steps of:

generating an anonymous player tracking account associated with the refused name player; and crediting the first award available to an anonymous player to the anonymous player tracking account.

17. The non-transitory computer-readable storage media of claim 16, wherein the computer-executable instructions cause the processor to perform the algorithm including the steps of:

detecting a physical player loyalty card being placed on the gaming surface of the gaming table using the object sensing system;

identifying a player tracking account associated with the detected physical player loyalty card; and initiating a gaming session associated with the identified player tracking account.

18. The non-transitory computer-readable storage media of claim 15, wherein the computer-executable instructions cause the processor to perform the algorithm including the steps of:

identifying a player tracking account associated with the player upon identifying a matching player tracking account having a corresponding face ID matching the received face ID; and initiating a gaming session associated with the identified player tracking account to track play of the player.

19. The non-transitory computer-readable storage media of claim 18, wherein the computer-executable instructions cause the processor to perform the algorithm including the steps of:

operating the video projection device to display a player tracking information menu on the physical gaming table upon identifying the player tracking account associated with the player.

20. The non-transitory computer-readable storage media of claim 19, wherein the computer-executable instructions cause the processor to perform the algorithm including the steps of:

identifying a player seat position occupied by the player; and operating the video projection device to display the player tracking information menu on the physical gaming table at a location associated with the identified player seat position.

* * * * *